United States Patent
Nimbalker et al.

(10) Patent No.: US 12,520,327 B2
(45) Date of Patent: Jan. 6, 2026

(54) DATA INDICATOR FOR DCI SCHEDULING MULTIPLE CELLS

(71) Applicant: Telefonaktiebolaget LM Ericsson (publ), Stockholm (SE)

(72) Inventors: Ajit Nimbalker, Fremont, CA (US); Ravikiran Nory, San José, CA (US); Robert Baldemair, Solna (SE); Petter Ersbo, Knivsta (SE); Zhanxian Wang, Täby (SE); Zhenhua Zou, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 389 days.

(21) Appl. No.: 18/018,620

(22) PCT Filed: Aug. 6, 2021

(86) PCT No.: PCT/EP2021/072104
§ 371 (c)(1),
(2) Date: Jan. 30, 2023

(87) PCT Pub. No.: WO2022/029332
PCT Pub. Date: Feb. 10, 2022

(65) Prior Publication Data
US 2023/0328752 A1    Oct. 12, 2023

Related U.S. Application Data

(60) Provisional application No. 63/062,537, filed on Aug. 7, 2020.

(51) Int. Cl.
*H04W 72/232* (2023.01)
*H04W 72/12* (2023.01)

(52) U.S. Cl.
CPC ......... *H04W 72/232* (2023.01); *H04W 72/12* (2013.01)

(58) Field of Classification Search
CPC . H04W 72/32; H04W 72/12; H04W 72/1289; H04W 72/1284; H04L 1/1854; H04L 1/1893
See application file for complete search history.

(56) References Cited

U.S. PATENT DOCUMENTS

| | | | |
|---|---|---|---|
| 2011/0182245 A1* | 7/2011 | Malkamaki | H04L 1/1854 370/329 |
| 2021/0160879 A1* | 5/2021 | Lin | H04W 72/0453 |
| 2021/0219322 A1* | 7/2021 | Chin | H04W 72/23 |

FOREIGN PATENT DOCUMENTS

| | | |
|---|---|---|
| EP | 3197204 A1 | 7/2017 |
| EP | 3567774 A1 | 11/2019 |
| KR | 20190028145 A | 3/2019 |

OTHER PUBLICATIONS

International Search Report and Written Opinion dated Nov. 25, 2021 for International Application No. PCT/ EP2021/072104 filed Aug. 6, 2021, consisting of 12-pages.

(Continued)

*Primary Examiner* — Iqbal Zaidi
(74) *Attorney, Agent, or Firm* — Weisberg I.P. Law, P.A.

(57) ABSTRACT

A method of operating a network node in a wireless communication system includes configuring a downlink control information (DCI) message that schedules uplink or downlink communications with a user equipment (UE) in a plurality of serving cells. The DCI message does not include an explicit new data indicator (NDI) field for at least one of the serving cells scheduled by the DCI message. The network node transmits the DCI message to the UE. A method performed by a UE includes receiving a DCI message that schedules uplink or downlink communications in a plurality of serving cells. The DCI message does not include an explicit NDI field for a serving cell scheduled by the DCI message. In response, the UE determines an NDI value (Continued)

```
Configuring a DCI message that does not include NDI for
at least one serving cell scheduled by the DCI message
                          502
                           |
                           v
        Transmitting the DCI message to a UE
                          504
```

```
Configuring a DCI message that does includes an explicit
NDI for a first serving cell scheduled by the DCI message,
the explicit NDI providing an implicit NDI for a second
        serving cell scheduled by the DCI message
                            512
                             |
                             v
          Transmitting the DCI message to a UE
                            514
``` associated with scheduled communications for the serving cell or determines that the scheduled communications for the serving cell contains a new data transmission.

14 Claims, 14 Drawing Sheets

(56) References Cited

OTHER PUBLICATIONS

Wikipedia Contributors; Norm (mathematics); Wikipedia, The Free Encyclopedia; Jun. 30, 2020, consisting of 9-pages.
Z. Wang et al.; Cross-lingual Knowledge Graph Alignment via Graph Convolutional Networks; Proceedings of the 2018 Conference on Empirical Methods in Natural Language Processing; Oct. 31-Nov. 4, 2018, consisting of 9-pages.
Md. Noor-A-Rahim et al.; A Survey on Resource Allocation in Vehicular Networks; ArXiv; Sep. 30, 2019, consisting of 17-pages.
3GPP TSG RAN WG1 Meeting #99 R1-1912199; Title: Enhancements to HARQ for NR-unlicensed; Agenda Item: 7.2.2.2.3; Source: Intel Corporation; Document for: Discussion/Decision; Date and Location: Nov. 18-22, 2019, Reno, USA, consisting of 13-pages.

* cited by examiner

DATA INDICATOR FOR DCI SCHEDULING MULTIPLE CELLS

CROSS-REFERENCE TO RELATED APPLICATIONS

This application is a Submission Under 35 U.S.C. § 371 for U.S. National Stage Patent Application of International Application No.: PCT/EP2021/072104, filed Aug. 6, 2021 entitled "NEW DATA INDICATOR FOR DCI SCHEDULING MULTIPLE CELLS," which claims priority to U.S. Provisional Application No. 63/062,537, filed Aug. 7, 2020, entitled "NEW DATA INDICATOR FOR DCI SCHEDULING MULTIPLE CELLS," the entireties of both of which are incorporated herein by reference.

FIELD

The present disclosure relates generally to communications, and more particularly, to wireless communications and related wireless devices and network nodes.

BACKGROUND

A simplified wireless communication system is illustrated in FIG. 1. The system includes a UE 10 that communicates with one or more access nodes 21, 22 using radio connections comprising component carriers 17P, 17S, 18. The access nodes 21, 22 are connected to a core network node 16. The access nodes 21-22 are part of a radio access network 15. As shown in FIG. 1, a UE 10 can be configured via carrier aggregation to communicate over multiple component carriers 17P, 17S to/from a single access node 21.

For wireless communication systems pursuant to 3GPP Evolved Packet System, EPS (also referred to as Long Term Evolution, LTE, or 4G) standard specifications, the access nodes 21, 22 correspond typically to an Evolved NodeB (eNB) and the core network node 16 corresponds typically to either a Mobility Management Entity (MME) and/or a Serving Gateway (SGW). The eNB is part of the radio access network 15, which in this case is the E-UTRAN (Evolved Universal Terrestrial Radio Access Network), while the MME and SGW are both part of the EPC (Evolved Packet Core network).

For wireless communication systems pursuant to 3GPP 5G System, 5GS (also referred to as New Radio, NR, or 5G) standard specifications, the access nodes 21-22 correspond typically to a 5G NodeB (gNB) and the core network node 16 corresponds typically to either an Access and Mobility Management Function (AMF) and/or a User Plane Function (UPF). The gNB is part of the radio access network 15, which in this case is the NG-RAN (Next Generation Radio Access Network), while the AMF and UPF are both part of the 5G Core Network (5GC).

The 5G System comprises an access network and a core network. The Access Network (AN) is the network that allows the UE to gain connectivity to the Core Network (CN), e.g. the base station which could be a gNB or an ng-eNB in 5G. The CN contains all the Network Functions (NF) ensuring a wide range of different functionalities such as session management, connection management, charging, authentication, etc.

When carrier aggregation is utilized in a wireless communication system, multiple component carriers (also referred to as cells) are configured for one UE. For each cell, hybrid automatic repeat request (HARQ) with multiple HARQ processes using stop-and-wait protocol (SAW) is supported. HARQ operation is specified in [2] for New Radio (NR) systems.

HARQ uses a combination of high-rate forward error-correcting coding and automatic repeat request (ARQ) error-control. In standard ARQ, redundant bits are added to data to be transmitted using an error-detecting (ED) code, such as a cyclic redundancy check (CRC). When a receiver detects a corrupted message, the receiver requests a new message from the sender. In Hybrid ARQ, the original data is encoded with a forward error correction (FEC) code, and the parity bits are transmitted upon request when a receiver detects an erroneous message. Thus, rather than being discarded, incorrectly received coded data blocks are stored in a soft buffer at the receiver. When the re-transmitted block is received, the two blocks are combined for decoding in a process called HARQ with soft combining.

Multiple HARQ processes may be active at the same time between a transmitter and receiver. Each HARQ process is associated a HARQ process ID (HPID). The use of multiple HARQ processes increases efficiency, because when one HARQ process is waiting for an acknowledgment, another process can use the channel to send data.

A base station schedules uplink and downlink transmissions by a user equipment (UE) by sending a downlink control information (DCI) message to the UE via a downlink control channel, such as the physical downlink control channel (PDCCH). DCI formats are specified in [1] for NR systems.

A new data indicator (NDI) field is included in the DCI for indicating new transmissions or retransmissions. A HARQ process identifier (HPID) is also included in the DCI to indicate the HARQ process to which the transmission or retransmission belongs.

For a given HARQ process ID, if the NDI bit is toggled relative to a previous NDI, then the NDI indicates that new data (e.g. a new transport block, TB) is being scheduled. If the NDI bit is not toggled relative the previous NDI for the same HPID, it indicates that the DCI is scheduling a retransmission of a TB.

For downlink HARQ operation, the base station typically relies on feedback from the UE, for example, in the form of ACK/NACK bits which are reported on uplink using a HARQ codebook. A HARQ codebook can contain ACK/NACK bits from the same or multiple cells and from one- or multiple-time instances or from one- or multiple HARQ process IDs.

An example of NDI and HPID is shown in FIG. 2, in which each box from left to right denotes a received DCI message. (Only the NDI and HPID values of each DCI message are shown in FIG. 2 for convenience). Whether the transport block indicated by the DCI is a new transport block or a retransmission of a previously transmitted transport block is determined by examining the value of the NDI received in a DCI and comparing against the most recent NDI value for the same HPID.

If the NDI value is not toggled, then it means the DCI corresponds to a retransmission (rtx) of a transport block (e.g. for the third DCI in FIG. 2, HPID=0, and the NDI is same as the NDI in the first DCI).

If the NDI value is toggled, then it means the DCI corresponds to new transmission (ntx) of a new transport block (e.g. for the fourth DCI in FIG. 2, HPID=1, and the NDI is toggled relative to the NDI in the second DCI with the same HPID value). This allows the UE to flush/update its soft buffer for downlink corresponding to the HPID (e.g. overwrite the soft buffer content with bits corresponding to the new TB), or flush/update the contents of the uplink buffer corresponding to the HPID with the new TB.

If there are two transport blocks scheduled for the same carrier (e.g. for 8-layer MIMO, two TBs per HARQ process with each TB occupying up to 4 layers each) using one DCI, then the DCI can contain two NDI fields, one per each TB in the DCI, but the two TBs may have the same HPID.

SUMMARY

A method of operating a network node in a wireless communication system includes configuring a downlink control information, DCI, message that schedules uplink or downlink communications with a user equipment, UE, in a plurality of serving cells, wherein the DCI message does not include an explicit new data indicator, NDI, field for at least one of the serving cells scheduled by the DCI message, and transmitting the DCI message to the UE.

The DCI message may not include an explicit NDI field for any of the serving cells scheduled by the DCI message. The DCI may message schedule new data transmissions on all of the serving cells scheduled by the DCI message. In some embodiments, the DCI message schedules data retransmissions on all of the serving cells scheduled by the DCI message. The DCI message may include an explicit NDI field for a first one of the serving cells scheduled by the DCI message.

In some embodiments, the explicit NDI field for the first one of the serving cells scheduled by the DCI message provides an implicit NDI indication for remaining ones of the serving cells scheduled by the DCI message.

In some embodiments, the implicit NDI indication for the remaining ones of the serving cells scheduled by the DCI message indicates that data retransmission is being scheduled for the remaining ones of the serving cells scheduled by the DCI message.

In some embodiments, the DCI message may include a hybrid automatic repeat request, HARQ, process identifier, HPID, for a first HARQ process associated with the at least one of the serving cells scheduled by the DCI message. The method may further include determining an NDI value for the HPID associated with a transmission scheduled by the DCI message for the first HARQ process.

In some embodiments, determining the NDI value for the HPID may include determining that the NDI value has toggled from a previous NDI value for the HPID. Determining the NDI value for the HPID may include determining that the NDI value has a predetermined value regardless of a previous NDI value for the HPID.

A network node according to some embodiments is configured to configure a downlink control information, DCI, message that schedules uplink or downlink communications with a user equipment, UE, in a plurality of serving cells, wherein the DCI message does not include an explicit new data indicator, NDI, field for at least one of the serving cells scheduled by the DCI message, and transmit the DCI message to the UE.

A network node according to some embodiments includes a processing circuit, a transceiver coupled to the processing circuit, and a memory coupled to the processing circuit. The memory includes computer readable program instructions that, when executed by the processing circuit, cause the network node to perform operations including configuring a downlink control information, DCI, message that schedules uplink or downlink communications with a user equipment, UE, in a plurality of serving cells, wherein the DCI message does not include an explicit new data indicator, NDI, field for at least one of the serving cells scheduled by the DCI message, and transmitting the DCI message to the UE.

A method according to some embodiments performed by a user equipment, UE, in a wireless communication system includes receiving a downlink control information, DCI, message with a first DCI format that schedules uplink or downlink communications in a plurality of serving cells, wherein the DCI message does not include an explicit new data indicator, NDI, field for at least one of the serving cells scheduled by the DCI message, and determining, in response to the DCI message, at least one of an NDI value associated with the scheduled communications for the at least one of the serving cells scheduled by the DCI message, and that the scheduled communications for the at least one of the serving cells scheduled by the DCI message contains a new data transmission.

In some embodiments, the UE may monitor a DCI message with a second DCI format that is different from the first DCI format, that schedules uplink or downlink communications in a single serving cell, the second DCI format containing an explicit NDI field for the single serving cell in addition to monitoring the DCI message that schedules uplink or downlink communications in the plurality of serving cells.

The DCI message may not include an explicit NDI field for any of the serving cells scheduled by the DCI message. In some embodiments, new data transmission on all of the serving cells is inferred by the UE in response to the DCI message. In some embodiments, data retransmission on all of the serving cells is inferred by the UE in response to the DCI message.

In some embodiments, the DCI message includes an explicit NDI field for a first one of the serving cells scheduled by the DCI message, and the explicit NDI field for the first one of the serving cells scheduled by the DCI message may provide an implicit NDI indication for remaining ones of the serving cells scheduled by the DCI message.

The implicit NDI indication for the remaining ones of the serving cells scheduled by the DCI message may indicate that data retransmission is being scheduled for the remaining ones of the serving cells scheduled by the DCI message.

The DCI message may include a hybrid automatic repeat request, HARQ, process identifier, HPID, for a first HARQ process associated with the at least one of the serving cells scheduled by the DCI message, and the method may further include determining an NDI value for the HPID associated with a transmission scheduled by the DCI message for the first HARQ process.

In some embodiments, determining the NDI value for the HPID includes determining that the NDI value has toggled from a previous NDI value for the HPID. In some embodiments, determining the NDI value for the HPID includes determining that the NDI value has a predetermined value regardless of a previous NDI value for the HPID.

The method may further include determining whether the determined NDI value indicates that a scheduled transmission associated with the HPID is a retransmission, receiving a transport block in the scheduled transmission, comparing a transport block size of the received transport block with a transport block size of a previously received transport block associated with the HPID, and in response to determining that the transport block size of the received transport block and the transport block size of the previously received transport block associated with the HPID do not match, flushing the previously received transport block associated with the HPID from a receive buffer.

The method may further include monitoring a first DCI message with the first DCI format that schedules uplink or downlink communications in a plurality of serving cells, wherein the DCI message does not include an explicit NDI field for at least one of the serving cells scheduled by the first DCI message, and, monitoring a second DCI message with a second DCI format that schedules uplink or downlink communications for only one serving cell, wherein the DCI message includes an explicit new data indicator, NDI, field for the serving cell scheduled by the second DCI message.

A communication device according to some embodiments is configured to receive a downlink control information, DCI, message that schedules uplink or downlink communications in a plurality of serving cells, wherein the DCI message does not include an explicit new data indicator, NDI, field for at least one of the serving cells scheduled by the DCI message, and determine, in response to the DCI message, at least one of an NDI value associated with one of the scheduled communications and that the scheduled communications contain new data transmission in all serving cells scheduled by the DCI message.

A communication device according to some embodiments includes a processing circuit, a transceiver coupled to the processing circuit, and a memory coupled to the processing circuit. The memory includes computer readable program instructions that, when executed by the processing circuit, cause the communication device to perform operations including receiving a downlink control information, DCI, message that schedules uplink or downlink communications in a plurality of serving cells, wherein the DCI message does not include an explicit new data indicator, NDI, field for at least one of the serving cells scheduled by the DCI message, and determining, in response to the DCI message, at least one of an NDI value associated with one of the scheduled communications and that the scheduled communications contain new data transmission in all serving cells scheduled by the DCI message.

A method of operating a network node in a wireless communication system according to further embodiments includes configuring a downlink control information, DCI, message that schedules uplink or downlink communications with a user equipment, UE, in a plurality of serving cells. The DCI message includes an explicit new data indicator, NDI, field for at least a first one of the serving cells scheduled by the DCI message. The explicit NDI field provides an implicit NDI indication for a second serving cell scheduled by the DCI message. The method further includes transmitting the DCI message to the UE. The explicit NDI indication may be applicable to all serving cells scheduled by the DCI message. The implicit NDI indication for the second serving cell may indicate that data retransmission is being scheduled for the second serving cell.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Figure 1:
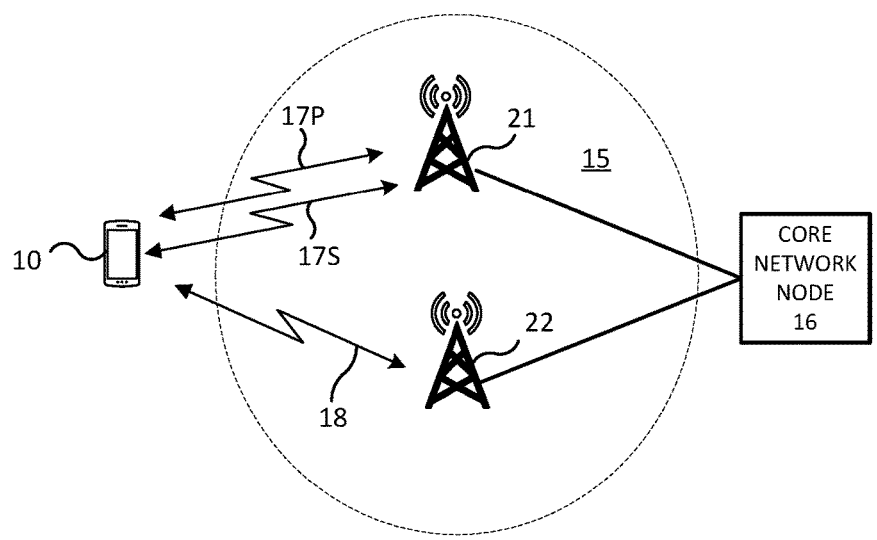
FIG. 1 illustrates a wireless communication system.
Figure 2:
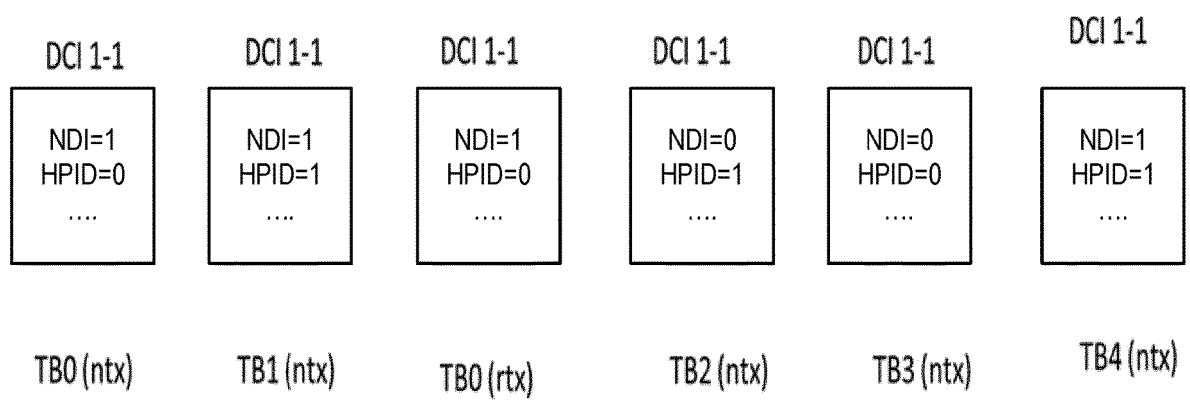
FIG. 2 illustrates DCI messages transmitted from a base station to a communication device.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

According to some embodiments, a DCI message transmitted to a UE may schedule PDSCH transmissions on multiple cells. When a DCI message schedules PDSCH transmissions on multiple cells, many fields of the DCI, including NDI, HPID, MCS, etc., must be included multiple times in the DCI. This can significantly increase the DCI payload size. It would be desirable to reduce/minimize such bloating of DCI payloads to improve PDCCH capacity and/or performance without unnecessarily compromising the overall system performance. Accordingly, some embodiments described herein reduce DCI payload size by omitting one or more explicit NDI fields in a DCI message. In particular, some embodiments provide that a DCI message that schedules multiple cells does not include an explicit NDI field. The transmission by a base station of a DCI message that schedules multiple cells acts an implicit indication that either new data or a data retransmission is scheduled by the DCI in the DCI message.

Accordingly, some embodiments described herein provide an implicit NDI indication in a DCI message. This may reduce DCI payload size and may help to avoid problems that arise when NDI bits are explicitly included in a DCI message that schedules multiple cells.

As noted above, a UE can be configured with multiple cells, or component carriers, via carrier aggregation. For a cell of the multiple cells, the UE can be configured to monitor one or more DCI messages that schedule a single cell, and to monitor one or more DCI messages that schedule multiple cells. In a DCI message scheduling multiple cells, only a portion of the DCI may contain scheduling information relevant for each cell. Some embodiments may provide enhanced DCI message formats for scheduling multiple cells that provide implicit new data indicator (NDI) to the UE.

A DCI message scheduling a single cell can be DCI format 1-0/1-1/1-2 for downlink transmission, and a DCI message scheduling a single cell can be DCI format 0-0/0-1/0-2 for uplink transmission.

Some embodiments described herein provide a DCI message having a new format, denoted '1-N', that schedules multiple cells. The new DCI format may omit an explicit NDI for at least one of the cells scheduled in the message. Instead, the DCI message format acts as an implicit indication of the NDI for a corresponding HARQ process (having an associated HPID) of at least one cell scheduled by the DCI message. That is, the DCI message having format 1-N can schedule uplink or downlink communications with the UE for a plurality of cells, and includes an explicit HPID value for each of the scheduled cells but does not contain an explicit corresponding NDI field for at least one of the scheduled cells. In some embodiments, the DCI message having format 1-N is interpreted by the UE as indicating a new data transmission for the corresponding HARQ process (e.g. indicated in DCI 1-N), while in other embodiments, the DCI message having format 1-N is interpreted by the UE as indicating data retransmission for the corresponding HARQ process (e.g. indicated in DCI 1-N). That is, in some embodiments, the message format 1-N itself implicitly indicates a new data transmission or retransmission for the corresponding HARQ process without an explicit NDI field. In some embodiments, a DCI message that schedules multiple cells may contain no explicit NDI field. That is, the DCI message that schedules multiple cells might be absent of an NDI field for each of the serving cells scheduled by the DCI message.

In one example, the new DCI format 1-N applies only to an initial dynamic downlink (DL) assignment, i.e., a downlink assignment scrambled by C-RNTI and MCS-C-RNTI. In other words, in some embodiments, the DCI format 1-N is not scrambled by CS-RNTI, which is used for SPS activation/de-activation and retransmission of a TB initially transmitted on DL Semi-Persistent-Scheduling (SPS). Similarly, some embodiments provide a new DCI format 0-N that applies only for an initial dynamic uplink (UL) grant while excluding UL configured grants (CG).

A DCI message having a format that schedules a single cell (e.g. DCI 1-1 which schedules a PDSCH for a single cell (CC1)) may still contain an explicit NDI field. Similarly, for another serving cell (CC2), another DCI format scheduling a single cell (CC2) may still contain an explicit NDI field.

Figure 3:
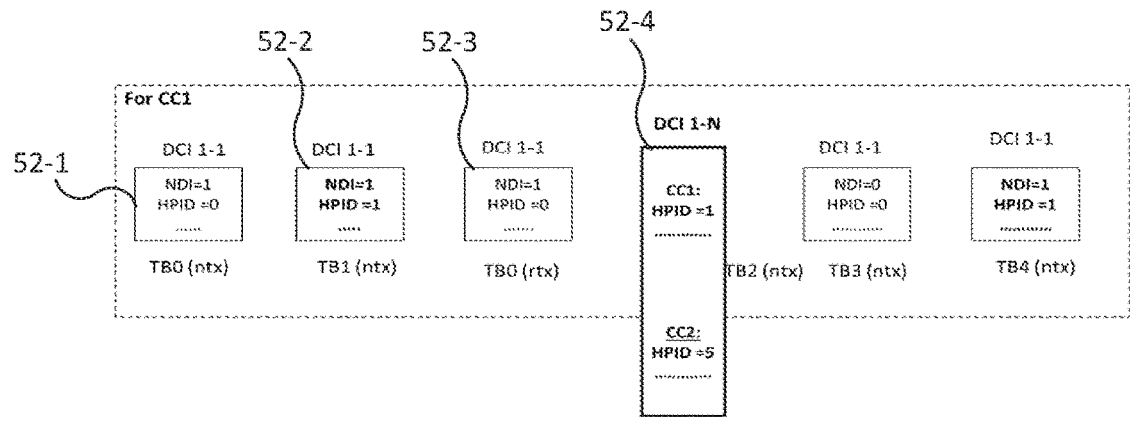
FIGS. 3 and 4 illustrate DCI messages transmitted from a base station to a communication device according to some embodiments.

FIG. 3 illustrates a number of DCI messages transmitted for one cell (CC1). Each DCI message has an associated DCI format (e.g., DCI 1-1, DCI 1-N), and includes scheduling information for a DL transmission of a specified transport block. For example, the first DCI message 52-1 has DCI format 1-1 and schedules a DL transmission of TB0 for the HARQ process having HPID=0. The DCI message 52-1 includes an NDI field that specifies NDI=1, which in this example indicates a new transmission rather than a retransmission.

Next, a DCI message 52-2 is received at the UE. The DCI message 52-2 specifies an NDI=1 for HPID=1, which in this example indicates a new transmission of TB1 for HPID=1.

A subsequent DCI message 52-3 having DCI format 1-1 and specifying HPID=0 is transmitted to the UE for the cell (CC1). The DCI message 52-3 includes an NDI field that specifies NDI=1. Because the NDI field is not toggled from the previously received NDI for HPID=0 in DCI message 52-1, this indicates that the scheduled transmission is a retransmission (rtx) of TB0.

The cell (CC1) can be scheduled using a DCI format for scheduling a single cell (e.g. DCI 1-1) and/or using a DCI format for scheduling multiple cells (e.g. DCI 1-N) where only a portion of the DCI may contain scheduling information relevant for each cell. For example, DCI message 52-4 has DCI format 1-N.

Upon reception of the DCI message 52-4 having DCI format 1-N, the UE obtains the HPID for CC1 as HPID=1. According to a first embodiment, the reception of a DCI format 1-N message itself indicates that a new data or new transport block is scheduled for HPID=1, e.g. TB2 (ntx). That is, according to this embodiment, the UE infers only from the reception of the DCI message 52-4 having format 1-N that new data (e.g. a new transport block) is scheduled for the corresponding HARQ processes having HPID=1 for cell CC1. Since there is no explicit NDI bit sent in the DCI message 52-4, the UE might derive an NDI field value for HPID=1 implicitly after receiving the message 52-4. This allows the network to schedule suitable retransmissions for the corresponding HPID, for example, using a DCI format for scheduling a single cell (e.g. DCI 1-1). Some methods for the UE to derive the NDI field value are described below.

In a first example, upon reception of the DCI message 52-4 having DCI format 1-N, the UE assumes that the NDI field value for the corresponding HPID and serving cell indicated by the message 52-4 is toggled from the most recent NDI field value received using DCI 1-1 (or any single-cell DL DCI) for that serving cell. For example, in FIG. 3, upon receipt of the DCI message 52-4, the UE may assume that NDI=0 for HPID=1 on CC1 (i.e. toggled from NDI=1 for HPID=1 previously received in DCI message 52-2 on CC1). In other words, upon receipt of message 52-4, the UE sets the NDI value for the corresponding HPID and serving cell by toggling from the most recently received NDI value for that HPID and serving cell, without an indication of the NDI value being contained in message 52-4. This behavior, or operational mode, of the UE might be pre-configured. It might be configured by the network node.

In a second example, upon reception of DCI 1-N, the UE assumes that the DCI format 1-N indicates new data is scheduled and that the updated NDI field value for the corresponding HPID and serving cell is given by a predetermined value (e.g. 1 or e.g. 0). For example, upon receipt of DCI message 52-4, the UE may assume that NDI=1 for HPID 1 for CC1. Thus, even though in this example the NDI is then NOT toggled from NDI=1 for HPID=1 for TB1(ntx), since there is an explicit rule that DCI 1-N schedules new data, there is no risk of soft-combining incorrectly. In other words, upon receipt of message 52-4, the UE sets the NDI value for the corresponding HPID and serving cell to a predetermined value, without an indication of the NDI value being contained in message 52-4. This behavior, or operational mode, of the UE might be pre-configured. It might be configured by the network node. The predetermined value might be configured by the network node.

In yet another example, for the very first received transmission for a TB (i.e. there is no previous NDI for this TB), a pre-determined value (e.g., 1 or 0) is used and it always indicates a new transmission. For the later transmission an NDI field value is toggled from the most recent NDI field received using DCI 1-1. In each of these examples, since the NDI value is clearly specified (in other words, implicitly set by the UE according to defined criteria), any retransmissions corresponding to transmissions made using DCI 1-N can be suitably scheduled using the corresponding DCIs scheduling single cell.

More generally, a UE can be configured to monitor a first PDCCH DCI format with DCI that can indicate a PDSCH scheduling assignment for only one serving cell. The first DCI format can indicate PDSCH scheduling assignments corresponding to either new transmissions or re-transmissions of TBs and the DCI of the first DCI format can include an NDI field.

According to some embodiments, the UE can also be configured to monitor an additional second PDCCH DCI format with DCI that can indicate PDSCH scheduling assignments for multiple serving cells (e.g. two cells a first cell and a second cell). The second DCI format can be configured (e.g., by the network node) to indicate PDSCH scheduling assignments corresponding to only new transmissions of TBs. Expressed in a different way, the UE can be configured to implicitly determine from just the reception of the DCI message having the second format that the PDSCH scheduling assignments indicated by that second DCI format correspond to only new transmissions of TBs. In such cases, an NDI field may not be included in the DCI of the second DCI format. When the UE detects a PDCCH with the second DCI format and the DCI indicates a PDSCH assignment for a first cell and includes a HPID field indicating a first HPID value for the first cell, the UE determines that a first TB (ntx-TBn1) should be received as a new transmission for a first HARQ process with first HPID for the first cell.

The UE can also determine a first NDI value associated with the second DCI format and corresponding to the first HARQ process for the first cell as follows. In one example, the UE can determine the first NDI value by considering that the NDI has been toggled (e.g. switched from a first binary state to a second binary state) compared to the previous NDI state for the first HARQ process for the first cell. In another example, the UE can determine the first NDI value by a) considering that the NDI has been toggled (e.g. switched from a first binary state to a second binary state) compared to the previous NDI state for the first HARQ process and/or b) considering that the NDI state after toggling is a pre-defined value (e.g. 0 or 1) regardless of the previous NDI state for the first HARQ process.

When the UE subsequently (i.e., after detection of a PDCCH with the second DCI format) detects a PDCCH with the first DCI format and the DCI indicates a PDSCH assignment for the first cell and includes a HPID field that indicates the first HPID value for the first cell, then if the NDI value in the DCI of the PDCCH with first DCI format is same as the first NDI value (i.e. the NDI value derived by the UE after detecting PDCCH with the second DCI format), the UE determines that a retransmission of the first TB (rtx-TBn1) should be received for the first HARQ process. If the NDI value in the DCI of the PDCCH with first DCI format is different from the first NDI value, then the UE determines that a new transmission of a second TB (ntx-TBn2) should be received for the first HARQ process.

While the above description describes the embodiments using downlink control information for scheduling PDSCH for reception of TBs on the downlink, the same mechanisms apply for using downlink control information for scheduling PUSCH transmissions of TBs on the uplink.

Figure 4:
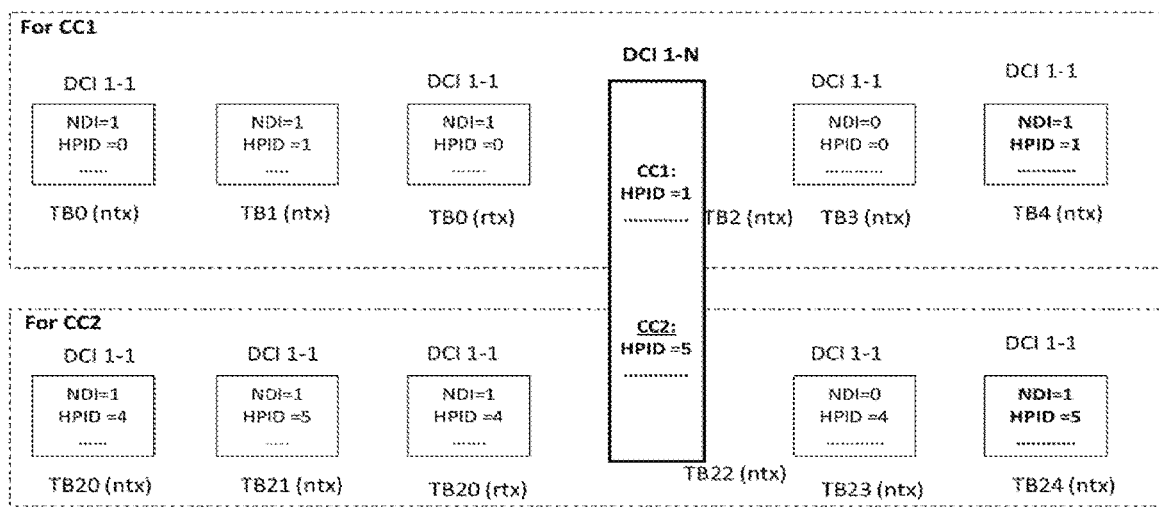

Another example is shown in FIG. 4, where the assignments for a second carrier (CC2) are also illustrated. The dotted boxes are shown to illustrate the DCIs 1-1 received are corresponding to the respective cells (CC1 and CC2), and the DCI scheduling multiple cells has control information relevant for both cells. In this example, when the DCI 1-N is received, for CC1, there is new data for HPID=1, and for CC2, there is new data for HPID=5. The implicit new data indicator field value derived from DCI 1-N can be assumed to be toggled from the NDI value associated with the most recent corresponding HPID for each cell. So, in this example, the UE can determine retransmissions of TB2 or TB22 can be made using respective DCI 1-1 (or any single-cell DL DCI) for the corresponding cells. So, in this example, the UE can determine the NDI value for DCI 1-N associated with HPID=1 for CC1 by toggling the NDI value associated with the preceding HPID=1 for CC1, which would give an implicit NDI value of '0'. Similarly, the UE can determine the NDI value for DCI 1-N associated with HPID=5 for CC2 by toggling the NDI value associated with the preceding HPID=5 for CC2, which would give an implicit NDI value of '0'. To continue the example, retransmissions e.g. of TB2 or TB22 can be subsequently scheduled using DCI 1-1 or DCI scheduling single cell using NDI=0.

In a further embodiment, the reception of a DCI message that schedules multiple cells (e.g. DCI 1-N) implicitly indicates a pre-determined NDI value (e.g. 0) for the corresponding HARQ processes for the corresponding cells. There is no explicit NDI field in the DCI message scheduling multiple cells. Thus, the UE can, in response to receiving the DCI message scheduling multiple cells, determine the NDI value for the corresponding HARQ processes for the corresponding cells is a predetermined value.

In yet further embodiments, only one NDI value is indicated in the DCI message and the same value implicitly applies for all other assignments contained in the DCI message. That is, the single NDI value implicitly applies to all cells scheduled in the DCI message. In yet further embodiments, this one NDI value refers to the scheduling cell in which the DCI message is transmitted, for a scheduled cell (i.e., another cell also scheduled in the DCI message), the DCI message implicitly schedules a new transmission or indicates a pre-determined NDI value (e.g. 0). That is, upon receiving the DCI message having format 1-N, the UE can determine the NDI value for one of the cells explicitly from the single NDI value contained in the message (e.g. for the scheduling cell in which the message is transmitted), and implicitly (e.g. through pre-configuration, for example, by the network node) determine the DCI message schedules a new transmission or indicates a pre-configured NDI value for each of the other cells scheduled by the DCI message.

A DCI message having a DCI format that schedules single cell (e.g. DCI 1-1 which schedules a PDSCH for a single cell (CC1) may still contain an explicit NDI field. Similarly, for another serving cell (CC2), another DCI format scheduling a single cell (CC2) may still contain an explicit NDI field.

For a cell and a given HPID indicated in DCI 1-N, if the UE determines that the NDI value upon reception of DCI 1-N is not toggled (i.e. the implicit NDI implies retransmission), but the TB size does not match a TB size received in a previous DCI for the same HPID, then a pre-determined rule can be specified that the UE assumes the DCI format 1-N message schedules new data and flushes old TB.

Typically, such cases (i.e., in which there is a toggled NDI but there is a TB size mismatch) are considered as resulting from false detection, and the UE's behavior in such cases (e.g. whether to receive new data or discard the DCI as being inconsistent) is left to UE implementation. By having a pre-determined rule as described above, the UE behavior can be clarified and enables use of DCI 1-N for retransmission.

Figure 5A:
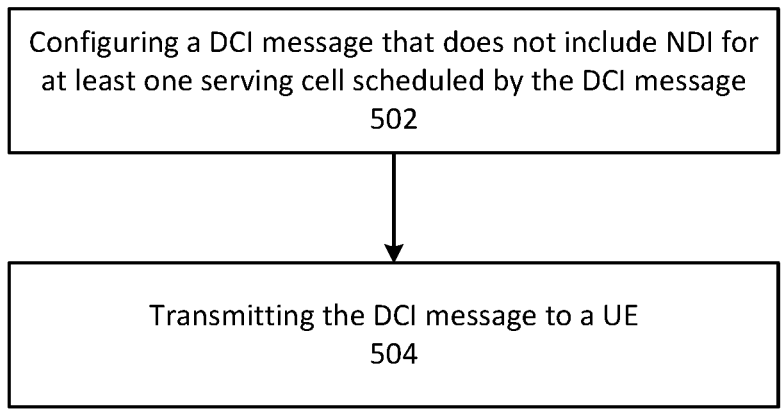
FIGS. 5A and 5B are flowcharts that illustrate operations of a network node according to some embodiments.

Referring to FIG. 5A, a method of operating a network node, such as a base station or gNB, in a wireless communication system includes preparing (502) a downlink control information, DCI, message that schedules uplink or downlink communications with a user equipment, UE, in a plurality of serving cells, wherein the DCI message does not include an explicit new data indicator, NDI, field for at least one of the serving cells scheduled by the DCI message, and transmitting (504) the DCI message to the UE. In some embodiments, the DCI message does not include an explicit NDI field for any of the serving cells scheduled by the DCI message.

In some embodiments, the DCI message schedules new data transmissions on all of the serving cells scheduled by the DCI message. In other embodiments, the DCI message schedules data retransmissions on all of the serving cells scheduled by the DCI message.

The DCI message may include an explicit NDI field for a first one of the serving cells scheduled by the DCI message, and the explicit NDI field for the first one of the serving cells scheduled by the DCI message may provide an implicit NDI indication for remaining ones of the serving cells scheduled by the DCI message. The DCI message may be transmitted in the first one of the serving cells.

The implicit NDI indication for the remaining ones of the serving cells scheduled by the DCI message may indicate that data retransmission is being scheduled for the remaining ones of the serving cells scheduled by the DCI message.

The DCI message may include a hybrid automatic repeat request, HARQ, process identifier, HPID, for a first HARQ process associated with the at least one of the serving cells scheduled by the DCI message, and the method further includes determining an NDI value for the HPID associated with a transmission scheduled by the DCI message for the first HARQ process.

In some embodiments, determining the NDI value for the HPID may include determining that the NDI value has toggled from a previous NDI value for the HPID. In other embodiments, determining the NDI value for the HPID includes determining that the NDI value has a predetermined value regardless of a previous NDI value for the HPID.

Figure 5B:
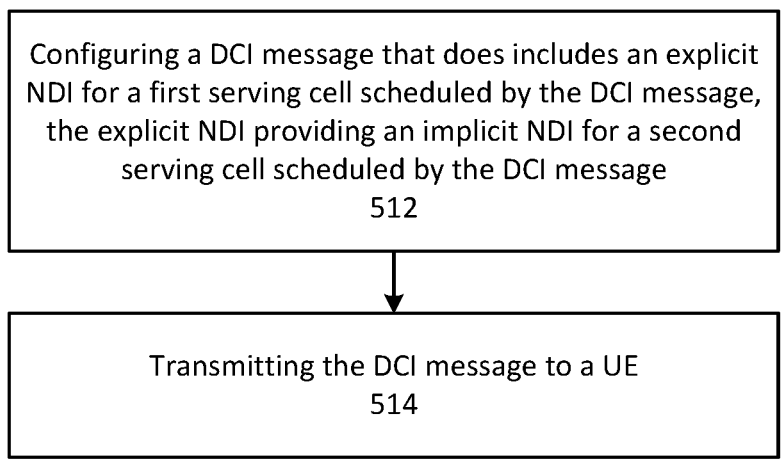

Referring to FIG. 5B, a method of operating a network node in a wireless communication system according to further embodiments is illustrated. The method includes configuring (block 512) a DCI message that schedules uplink or downlink communications with a UE in a plurality of serving cells. The DCI message includes an explicit NDI field for at least a first one of the serving cells scheduled by the DCI message. The explicit NDI field provides an implicit NDI indication for a second serving cell scheduled by the DCI message. The method further includes transmitting (block 514) the DCI message to the UE. The explicit NDI indication may be applicable to all serving cells scheduled by the DCI message. The implicit NDI indication for the second serving cell may indicate that data retransmission is being scheduled for the second serving cell.

Figure 6:
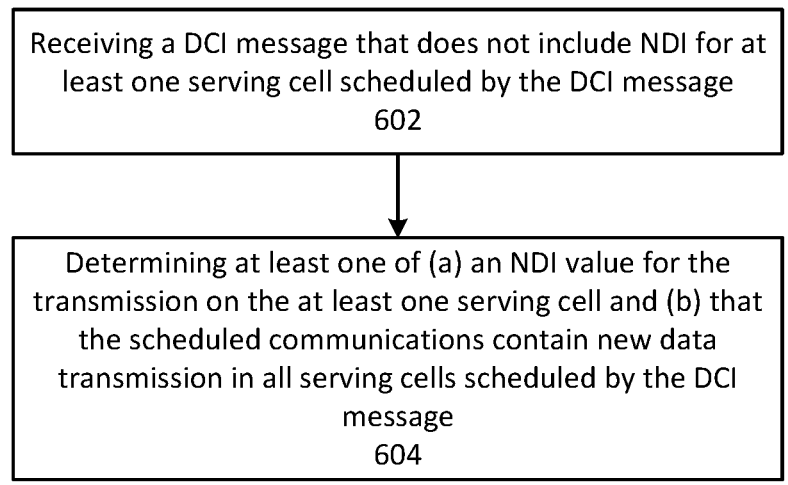
FIG. 6 is a flowchart that illustrate operations of a communication device according to some embodiments.

Referring to FIG. 6, a method of operating a user equipment, UE, in a wireless communication system includes receiving (602) a DCI message that schedules uplink or downlink communications in a plurality of serving cells. The DCI message does not include an explicit NDI field for at least one of the serving cells scheduled by the DCI message. The method further includes determining (604), in response to the DCI message, at least one of (a) an NDI value associated with one of the scheduled communications and (b) that the scheduled communications contain new data transmission in all serving cells scheduled by the DCI message.

The DCI message may not include an explicit NDI field for any of the serving cells scheduled by the DCI message.

In some embodiments, the DCI message may schedule new data transmissions on all of the serving cells scheduled by the DCI message. In other embodiments, the DCI message may schedule data retransmissions on all of the serving cells scheduled by the DCI message.

In some embodiments, the DCI message includes an explicit NDI field for a first one of the serving cells scheduled by the DCI message, and the explicit NDI field for the first one of the serving cells scheduled by the DCI message provides an implicit NDI indication for remaining ones of the serving cells scheduled by the DCI message. The DCI message may be transmitted in the first one of the serving cells.

The implicit NDI indication for the remaining ones of the serving cells scheduled by the DCI message may indicate that data retransmission is being scheduled for the remaining ones of the serving cells scheduled by the DCI message.

The DCI message may include a hybrid automatic repeat request, HARQ, process identifier, HPID, for a first HARQ process associated with the at least one of the serving cells scheduled by the DCI message, and the method further includes determining an NDI value for the HPID associated with a transmission scheduled by the DCI message for the first HARQ process.

In some embodiments, determining the NDI value for the HPID includes determining that the NDI value has toggled from a previous NDI value for the HPID. In other embodiments, determining the NDI value for the HPID includes determining that the NDI value has a predetermined value regardless of a previous NDI value for the HPID.

The method may further include determining whether the determined NDI value indicates that a scheduled transmission associated with the HPID is a retransmission, receiving a transport block in the scheduled transmission, comparing a transport block size of the received transport block with a transport block size of a previously received transport block associated with the HPID, and in response to determining that the transport block size of the received transport block and the transport block size of the previously received transport block associated with the HPID do not match, flushing the previously received transport block associated with the HPID from a receive buffer.

Figure 7:
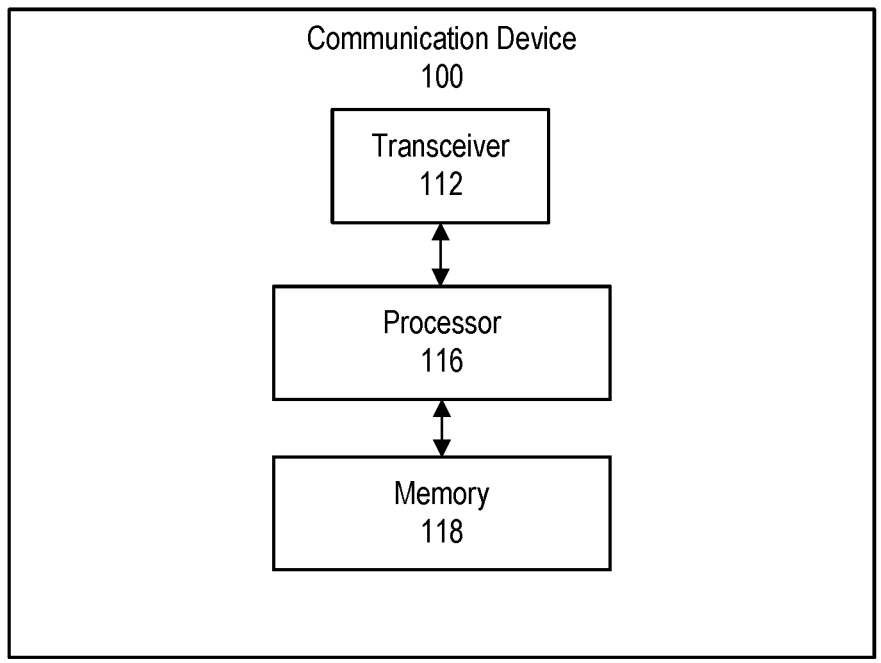
FIG. 7 is a block diagram illustrating an example of a communication device according to some embodiments.

FIG. 7 depicts an example of a communication device 100 of a wireless communication network configured to provide wireless communication according to embodiments of inventive concepts. As shown, the communication device 100 may include a transceiver circuit 112 (also referred to as a transceiver) including a transmitter and a receiver configured to provide uplink and downlink radio communications with wireless devices. The communication device 100 may also include a processor circuit 116 (also referred to as a processor) coupled to the transceiver circuit 112, and a memory circuit 118 (also referred to as memory) coupled to the processor circuit 116. The memory circuit 118 may include computer readable program code that when executed by the processor circuit 116 causes the processor circuit to perform operations according to embodiments disclosed herein. According to other embodiments, processor circuit 116 may be defined to include memory so that a separate memory circuit is not required.

As discussed herein, operations of the communication device 100 may be performed by processor 116 and/or transceiver 112. For example, the processor 116 may control transceiver 112 to transmit uplink communications through transceiver 112 over a radio interface to one or more network nodes and/or to receive downlink communications through transceiver 112 from one or more network nodes over a radio interface. Moreover, modules may be stored in memory 118, and these modules may provide instructions so that when instructions of a module are executed by processor 116, processor 116 performs respective operations (e.g., operations discussed above with respect to example embodiments).

Accordingly, a communication device 100 according to some embodiments includes a processor circuit 116, a transceiver 112 coupled to the processor circuit, and a memory 118 coupled to the processor circuit, the memory including machine readable program instructions that, when executed by the processor circuit, cause the UE to perform operations described above.

Figure 9:
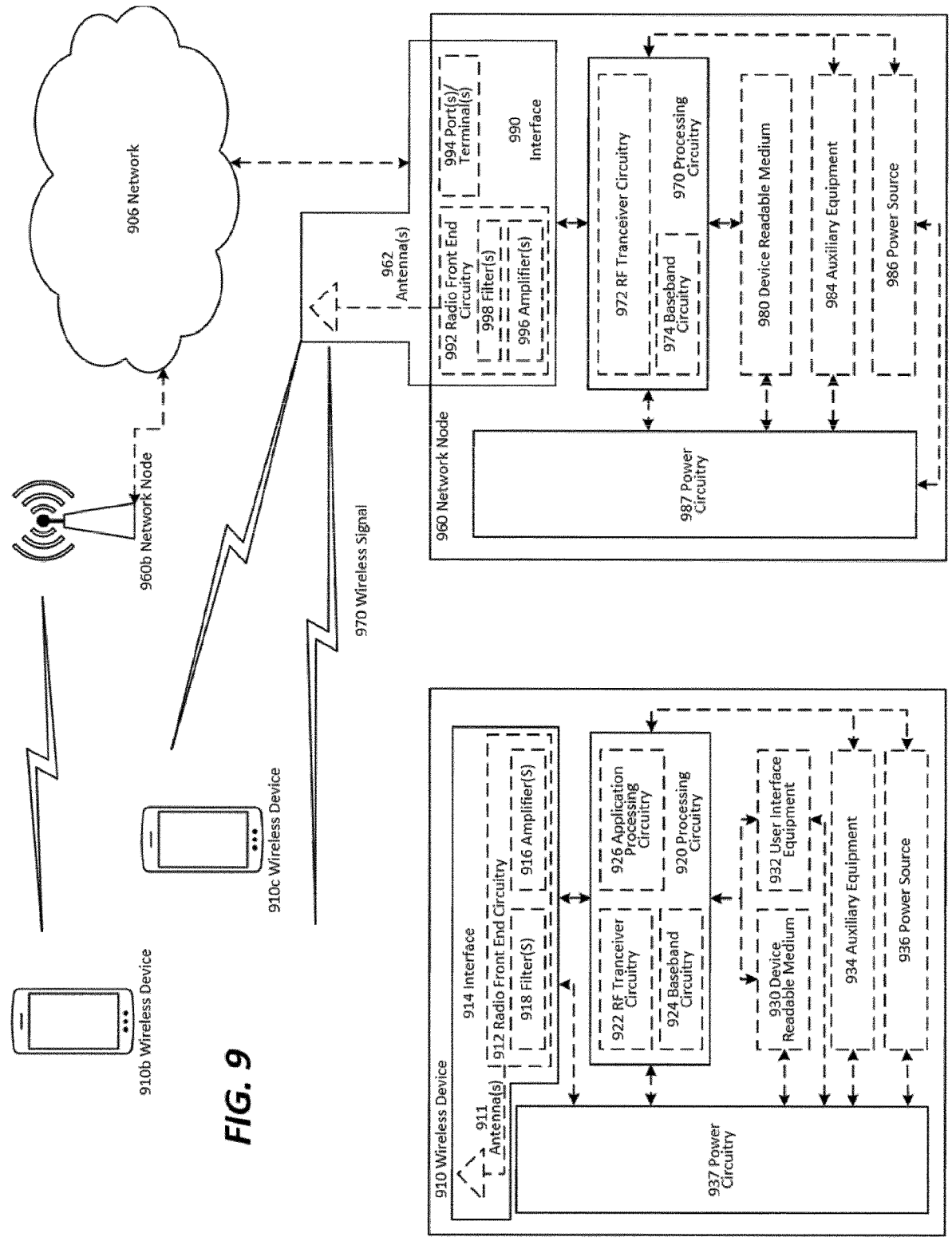
FIG. 9 is a block diagram of a wireless network in accordance with some embodiments.

A further example of a communication device 100 is the wireless device 910 shown in FIG. 9.

Figure 8:
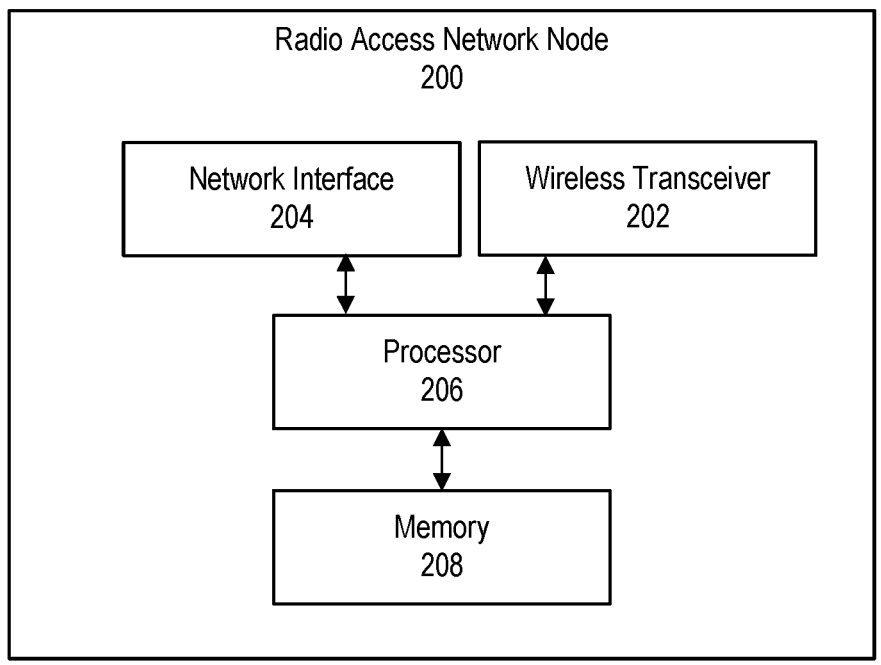
FIG. 8 is a block diagram illustrating an example of a radio access network (RAN) node according to some embodiments.

FIG. 8 is a block diagram of a network node 200 according to some embodiments. Various embodiments provide a radio access network node that includes a processor circuit 206 and a memory 208 coupled to the processor circuit. The memory 208 includes machine-readable computer program instructions that, when executed by the processor circuit, cause the processor circuit to perform some of the operations depicted.

FIG. 8 depicts an example of a radio access network node 200 of a wireless communication network configured to provide cellular communication according to embodiments of inventive concepts. The network node 200 may include a network interface circuit 204 (also referred to as a network interface) configured to provide communications with other nodes (e.g., with other base stations and/or core network nodes) of the wireless communication network. The network node 200 may further include a wireless transceiver 202 for performing wireless communications with a communication device 100. The memory circuit 208 may include computer readable program code that when executed by the processor circuit 206 causes the processor circuit to perform operations according to embodiments disclosed herein. According to other embodiments, processor circuit 206 may be defined to include memory so that a separate memory circuit is not required.

As discussed herein, operations of the network node 200 may be performed by processor 206, wireless transceiver 202 and/or network interface 204. For example, processor 206 may control network interface 204 to transmit communications through network interface 204 to one or more other network nodes and/or to receive communications through network interface from one or more other network nodes. Moreover, modules may be stored in memory 208, and these modules may provide instructions so that when instructions of a module are executed by processor 206, processor 206 performs respective operations. In addition, a structure similar to that of FIG. 8 may be used to implement other network nodes. Moreover, network nodes discussed herein may be implemented as virtual network nodes.

A further example of a network node 200 is the network node 960 shown in FIG. 9.

A communication device (100) according to some embodiments is configured to receive (602) a downlink control information, DCI, message that schedules uplink or downlink communications in a plurality of serving cells, wherein the DCI message does not include an explicit new data indicator, NDI, field for at least one of the serving cells scheduled by the DCI message; and determine (604), in response to the DCI message, at least one of (a) an NDI value associated with one of the scheduled communications and (b) that the scheduled communications contain new data transmission in all serving cells scheduled by the DCI message.

A communication device (100) according to some embodiments includes a processing circuit (116), a transceiver (112) coupled to the processing circuit, and a memory (118) coupled to the processing circuit. The memory includes computer readable program instructions that, when executed by the processing circuit, cause the communication device to perform operations including receiving (602) a downlink control information, DCI, message that schedules uplink or downlink communications in a plurality of serving cells, wherein the DCI message does not include an explicit new data indicator, NDI, field for at least one of the serving cells scheduled by the DCI message; and determining (604), in response to the DCI message, at least one of (a) an NDI value associated with the scheduled communications and (b) that the scheduled communications contain new data transmission in all serving cells scheduled by the DCI message.

A network node (200) according to some embodiments is configured to prepare (502) a downlink control information, DCI, message that schedules uplink or downlink communications with a user equipment, UE, in a plurality of serving cells, wherein the DCI message does not include an explicit new data indicator, NDI, field for at least one of the serving cells scheduled by the DCI message, and transmit (504) the DCI message to the UE.

A network node (200) according to some embodiments includes a processing circuit (206), a transceiver (202) coupled to the processing circuit, and a memory (208) coupled to the processing circuit. The memory includes computer readable program instructions that, when executed by the processing circuit, cause the network node to perform operations including preparing (502) a downlink control information, DCI, message that schedules uplink or downlink communications with a user equipment, UE, in a plurality of serving cells, wherein the DCI message does not include an explicit new data indicator, NDI, field for at least one of the serving cells scheduled by the DCI message, and transmitting (504) the DCI message to the UE.

LISTING OF EXAMPLE EMBODIMENTS

Example Embodiments are discussed below.

Embodiment 1. A method of operating a network node in a wireless communication system, comprising:
preparing a downlink control information, DCI, message that schedules uplink or downlink communications with a user equipment, UE, in a plurality of serving cells, wherein the DCI message does not include an explicit new data indicator, NDI, field for at least one of the serving cells scheduled by the DCI message; and
transmitting the DCI message to the UE.

Embodiment 2. The method of Embodiment 1, wherein the DCI message does not include an explicit NDI field for any of the serving cells scheduled by the DCI message.

Embodiment 3. The method of Embodiment 1 or 2, wherein the DCI message schedules new data transmissions on all of the serving cells scheduled by the DCI message.

Embodiment 4. The method of Embodiment 1 or 2, wherein the DCI message schedules data retransmissions on all of the serving cells scheduled by the DCI message.

Embodiment 5. The method of Embodiment 1, wherein the DCI message includes an explicit NDI field for a first one of the serving cells scheduled by the DCI message, and wherein the explicit NDI field for the first one of the serving cells scheduled by the DCI message provides an implicit NDI indication for remaining ones of the serving cells scheduled by the DCI message.

Embodiment 6. The method of Embodiment 5, wherein the implicit NDI indication for the remaining ones of the serving cells scheduled by the DCI message indicates that data retransmission is being scheduled for the remaining ones of the serving cells scheduled by the DCI message.

Embodiment 7. The method of Embodiment 5, wherein the first one of the serving cells comprises the serving cell on which the DCI message is transmitted.

Embodiment 8. The method of any previous Embodiment, wherein the DCI message comprises a hybrid automatic repeat request, HARQ, process identifier, HPID, for a first HARQ process associated with the at least one of the serving cells scheduled by the DCI message, the method further comprising:
determining an NDI value for the HPID associated with a transmission scheduled by the DCI message for the first HARQ process.

Embodiment 9. The method of Embodiment 8, wherein determining the NDI value for the HPID comprises determining that the NDI value has toggled from a previous NDI value for the HPID.

Embodiment 10. The method of Embodiment 8, wherein determining the NDI value for the HPID comprises determining that the NDI value has a predetermined value regardless of a previous NDI value for the HPID.

Embodiment 11. The method of any previous Embodiment, wherein the DCI message is scrambled by a C-RNTI or MCS-C-RNTI.

Embodiment 12. A network node is configured to:
prepare a downlink control information, DCI, message that schedules uplink or downlink communications with a user equipment, UE, in a plurality of serving cells, wherein the DCI message does not include an explicit new data indicator, NDI, field for at least one of the serving cells scheduled by the DCI message; and
transmit the DCI message to the UE.

Embodiment 13. A network node includes a processing circuit, a transceiver coupled to the processing circuit, and a memory coupled to the processing circuit, wherein the memory includes computer readable program instructions that, when executed by the processing circuit, cause the network node to perform operations comprising:
preparing a downlink control information, DCI, message that schedules uplink or downlink communications with a user equipment, UE, in a plurality of serving cells, wherein the DCI message does not include an explicit new data indicator, NDI, field for at least one of the serving cells scheduled by the DCI message; and
transmitting the DCI message to the UE.

Embodiment 14. A method performed by a user equipment, UE, in a wireless communication system, comprising:
receiving a downlink control information, DCI, message that schedules uplink or downlink communications in a plurality of serving cells, wherein the DCI message does not include an explicit new data indicator, NDI, field for at least one of the serving cells scheduled by the DCI message; and
determining, in response to the DCI message, at least one of an NDI value associated with one of the scheduled communications and that the scheduled communications contain new data transmission in all serving cells scheduled by the DCI message.

Embodiment 15. The method of Embodiment 14, wherein the DCI message does not include an explicit NDI field for any of the serving cells scheduled by the DCI message.

Embodiment 16. The method of Embodiment 14 or 15, wherein the UE schedules new data transmissions on all of the serving cells scheduled in response to the DCI message.

Embodiment 17. The method of Embodiment 14 or 15, wherein the UE schedules data retransmissions on all of the serving cells in response to the DCI message.

Embodiment 18. The method of Embodiment 14, wherein the DCI message includes an explicit NDI field for a first one of the serving cells scheduled by the DCI message, and wherein the explicit NDI field for the first one of the serving cells scheduled by the DCI message provides an implicit NDI indication for remaining ones of the serving cells scheduled by the DCI message.

Embodiment 19. The method of Embodiment 18, wherein the implicit NDI indication for the remaining ones of the serving cells scheduled by the DCI message indicates that data retransmission is being scheduled for the remaining ones of the serving cells scheduled by the DCI message.

Embodiment 20. The method of Embodiment 18, wherein the first one of the serving cells comprises the serving cell on which the DCI message is transmitted.

Embodiment 21. The method of any of Embodiments 14 to 20, wherein the DCI message comprises a hybrid automatic repeat request, HARQ, process identifier, HPID, for a first HARQ process associated with the at least one of the serving cells scheduled by the DCI message, the method further comprising:
determining an NDI value for the HPID associated with a transmission scheduled by the DCI message for the first HARQ process.

Embodiment 22. The method of Embodiment 21, wherein determining the NDI value for the HPID comprises determining that the NDI value has toggled from a previous NDI value for the HPID.

Embodiment 23. The method of Embodiment 21, wherein determining the NDI value for the HPID comprises determining that the NDI value has a predetermined value regardless of a previous NDI value for the HPID.

Embodiment 24. The method of Embodiment 21, further comprising:

determining whether the determined NDI value indicates that a scheduled transmission associated with the HPID is a retransmission;

receiving a transport block in the scheduled transmission;

comparing a transport block size of the received transport block with a transport block size of a previously received transport block associated with the HPID; and in response to determining that the transport block size of the received transport block and the transport block size of the previously received transport block associated with the HPID do not match, flushing the previously received transport block associated with the HPID from a receive buffer.

Embodiment 25. The method of Embodiment 14, further comprising:

monitoring a first DCI message that schedules uplink or downlink communications for only one serving cell, wherein the DCI message includes an explicit new data indicator, NDI, field for the serving cell scheduled by the DCI message; and monitoring a second DCI message that schedules uplink or downlink communications in a plurality of serving cells, wherein the DCI message does not include an explicit NDI field for at least one of the serving cells scheduled by the DCI message.

Embodiment 26. A communication device is configured to:

receive a downlink control information, DCI, message that schedules uplink or downlink communications in a plurality of serving cells, wherein the DCI message does not include an explicit new data indicator, NDI, field for at least one of the serving cells scheduled by the DCI message; and determine, in response to the DCI message, at least one of an NDI value associated with one of the scheduled communications and that the scheduled communications contain new data transmission in all serving cells scheduled by the DCI message.

Embodiment 27. A communication device includes a processing circuit, a transceiver coupled to the processing circuit, and a memory coupled to the processing circuit, wherein the memory includes computer readable program instructions that, when executed by the processing circuit, cause the communication device to perform operations comprising:

receiving a downlink control information, DCI, message that schedules uplink or downlink communications in a plurality of serving cells, wherein the DCI message does not include an explicit new data indicator, NDI, field for at least one of the serving cells scheduled by the DCI message; and determining, in response to the DCI message, at least one of an NDI value associated with one of the scheduled communications and that the scheduled communications contain new data transmission in all serving cells scheduled by the DCI message.

Explanations for abbreviations from the above disclosure are provided below.

Abbreviation Explanation

3GPP 3rd Generation Partnership Project
5G 5th Generation
AAA Authentication, Authorization and Accounting
ACK Acknowledgment
ACK/NACK Acknowledgment/Not-acknowledgment
AF Application Function
AMF Access and Mobility Management Function
AN Access Network
ARPF Authentication credential Repository and Processing Function
AS Access Stratum
CN Core Network
C-RNTI Cell Radio Network Temporary Identifier
DCI Downlink Control Information
DL Downlink
DN Data Network
eNB Evolved NodeB (a radio base station in LTE)
gNB A radio base station in NR.
HARQ Hybrid Automatic Repeat Request
ID Identity
IETF Internet Engineering Task Force
LTE Long Term Evolution
MCS Modulation and Coding Scheme
MCS-C-RNTI MCS Cell Radio Network Temporary Identifier
ME Mobile Equipment
MIMO Multiple Input Multiple Output
NACK Negative Acknowledgment
NAS Non-Access Stratum
NF Network Function
NRF NF Repository Function
NEF Network Exposure Function
NSSF Network Slice Selection Function
NR New Radio
PCF Policy Control Function
PDCCH Physical Downlink Control Channel
PDSCH Physical Downlink Shared Channel
PRACH Physical Random-Access Channel
PUCCH Physical Uplink Control Channel
PUSCH Physical Uplink Shared Channel
PLMN Public Land Mobile Network
RAN Radio Access Network
SMF Session Management Function
TB Transport Block
UPF User Plane Function
UCI Uplink Control Information
UE User Equipment
UL Uplink

REFERENCES

3GPP TS 38.212 v. 16.1.0
3GPP TS 38.321 v. 16.0.0

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, a "communication device" may be any device intended for accessing services via an access network and configured to communicate over the access network. For instance, the communication device may be, but is not limited to: a user equipment (UE), mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The communication device may be a portable, pocketstorable, hand-held, computer-comprised, or vehicle-mounted mobile device, enabled to communicate voice and/or data, via a wireless or wireline connection.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components, or functions but does not preclude the presence or addition of one or more other features, integers, elements, steps, components, functions, or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate.

Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

FIG. 9: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 906, network nodes 960 and 960b, and WDs 910, 910b, and 910c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and a RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units.

In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signalling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 990 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 9 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 may include multiple sets of one or more of the illustrated components for different wireless technologies supported by WD 910, such as, for example, GSM, WCDMA, LTE, NR, WiFi, WiMAX, or Bluetooth wireless technologies, just to mention a few. These wireless technologies may be integrated into the same or different chips or set of chips as other components within WD 910.

Antenna 911 may include one or more antennas or antenna arrays, configured to send and/or receive wireless signals, and is connected to interface 914. In certain alternative embodiments, antenna 911 may be separate from WD 910 and be connectable to WD 910 through an interface or port. Antenna 911, interface 914, and/or processing circuitry 920 may be configured to perform any receiving or transmitting operations described herein as being performed by a WD. Any information, data and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and is configured to condition signals communicated between antenna 911 and processing circuitry 920. Radio front end circuitry 912 may be coupled to or a part of antenna 911. In some embodiments, WD 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910 may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionality described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated. User interface equipment 932 may provide components that allow for a human user to interact with WD 910. Such interaction may be of many forms, such as visual, audial, tactile, etc. User interface equipment 932 may be operable to produce output to the user and to allow the user to provide input to WD 910. The type of interaction may vary depending on the type of user interface equipment 932 installed in WD 910. For example, if WD 910 is a smart phone, the interaction may be via a touch screen; if WD 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910. User interface equipment 932 may include, for example, a speaker, a display, vibrating circuitry, a USB port, a headphone interface, or other output circuitry. Using one or more input and output interfaces, devices, and circuits, of user interface equipment 932, WD 910 may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. WD 910 may further comprise power circuitry 937 for delivering power from power source 936 to the various parts of WD 910 which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910 to which power is supplied.

Figure 10:
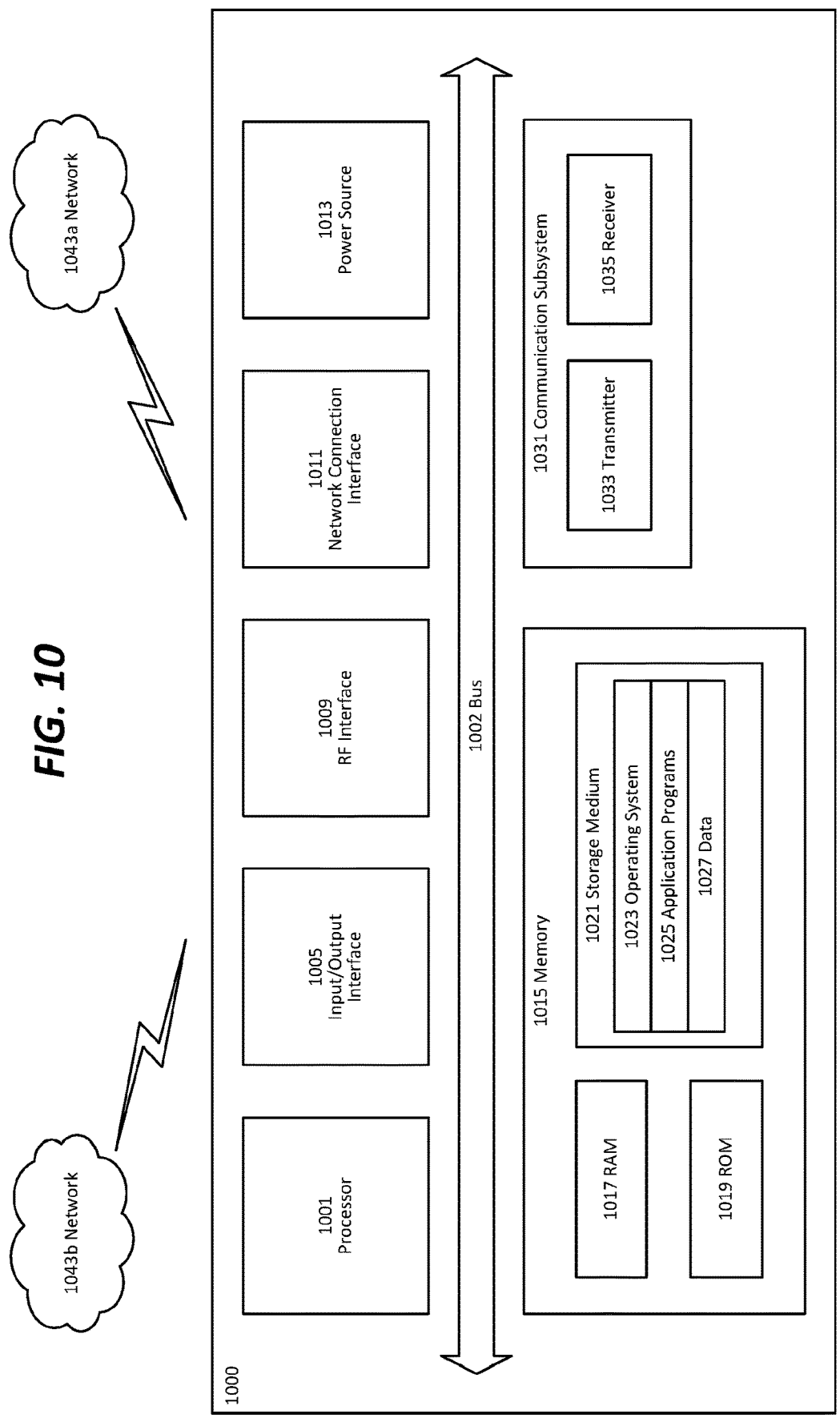
FIG. 10 is a block diagram of a user equipment in accordance with some embodiments.

FIG. 10: User Equipment in accordance with some embodiments

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 10200 may be any UE identified by the 3rd Generation Partnership Project (3GPP), including a NB-IoT UE, a machine type communication (MTC) UE, and/or an enhanced MTC (eMTC) UE. UE 1000, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device. UE 1000 may be configured to use an output device via input/output interface 1005. An output device may use the same type of interface port as an input device. For example, a USB port may be used to provide input to and output from UE 1000. The output device may be a speaker, a sound card, a video card, a display, a monitor, a printer, an actuator, an emitter, a smartcard, another output device, or any combination thereof. UE 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1009 may be configured to provide a communication interface to RF components such as a transmitter, a receiver, and an antenna. Network connection interface 1011 may be configured to provide a communication interface to network 1043a. Network 1043a may encompass wired and/or wireless networks such as a local-area network (LAN), a wide-area network (WAN), a computer network, a wireless network, a telecommunications network, another like network or any combination thereof. For example, network 1043a may comprise a Wi-Fi network. Network connection interface 1011 may be configured to include a receiver and a transmitter interface used to communicate with one or more other devices over a communication network according to one or more communication protocols, such as Ethernet, TCP/IP, SONET, ATM, or the like. Network connection interface 1011 may implement receiver and transmitter functionality appropriate to the communication network links (e.g., optical, electrical, and the like). The transmitter and receiver functions may share circuit components, software or firmware, or alternatively may be implemented separately.

RAM 1017 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by UE 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow UE 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium.

In FIG. 10, processing circuitry 1001 may be configured to communicate with network 1043*b* using communication subsystem 1031. Network 1043*a* and network 1043*b* may be the same network or networks or different network or networks. Communication subsystem 1031 may be configured to include one or more transceivers used to communicate with network 1043*b*. For example, communication subsystem 1031 may be configured to include one or more transceivers used to communicate with one or more remote transceivers of another device capable of wireless communication such as another WD, UE, or base station of a radio access network (RAN) according to one or more communication protocols, such as IEEE 802.10, CDMA, WCDMA, GSM, LTE, UTRAN, WiMax, or the like. Each transceiver may include transmitter 1033 and/or receiver 1035 to implement transmitter or receiver functionality, respectively, appropriate to the RAN links (e.g., frequency allocations and the like). Further, transmitter 1033 and receiver 1035 of each transceiver may share circuit components, software or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, Wi-Fi communication, Bluetooth communication, and GPS communication. Network 1043*b* may encompass wired and/or wireless networks such as a local-area network (LAN), a wide-area network (WAN), a computer network, a wireless network, a telecommunications network, another like network or any combination thereof. For example, network 1043*b* may be a cellular network, a Wi-Fi network, and/or a near-field network. Power source 1013 may be configured to provide alternating current (AC) or direct current (DC) power to components of UE 1000.

The features, benefits and/or functions described herein may be implemented in one of the components of UE 1000 or partitioned across multiple components of UE 1000. Further, the features, benefits, and/or functions described herein may be implemented in any combination of hardware, software or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

Figure 11:
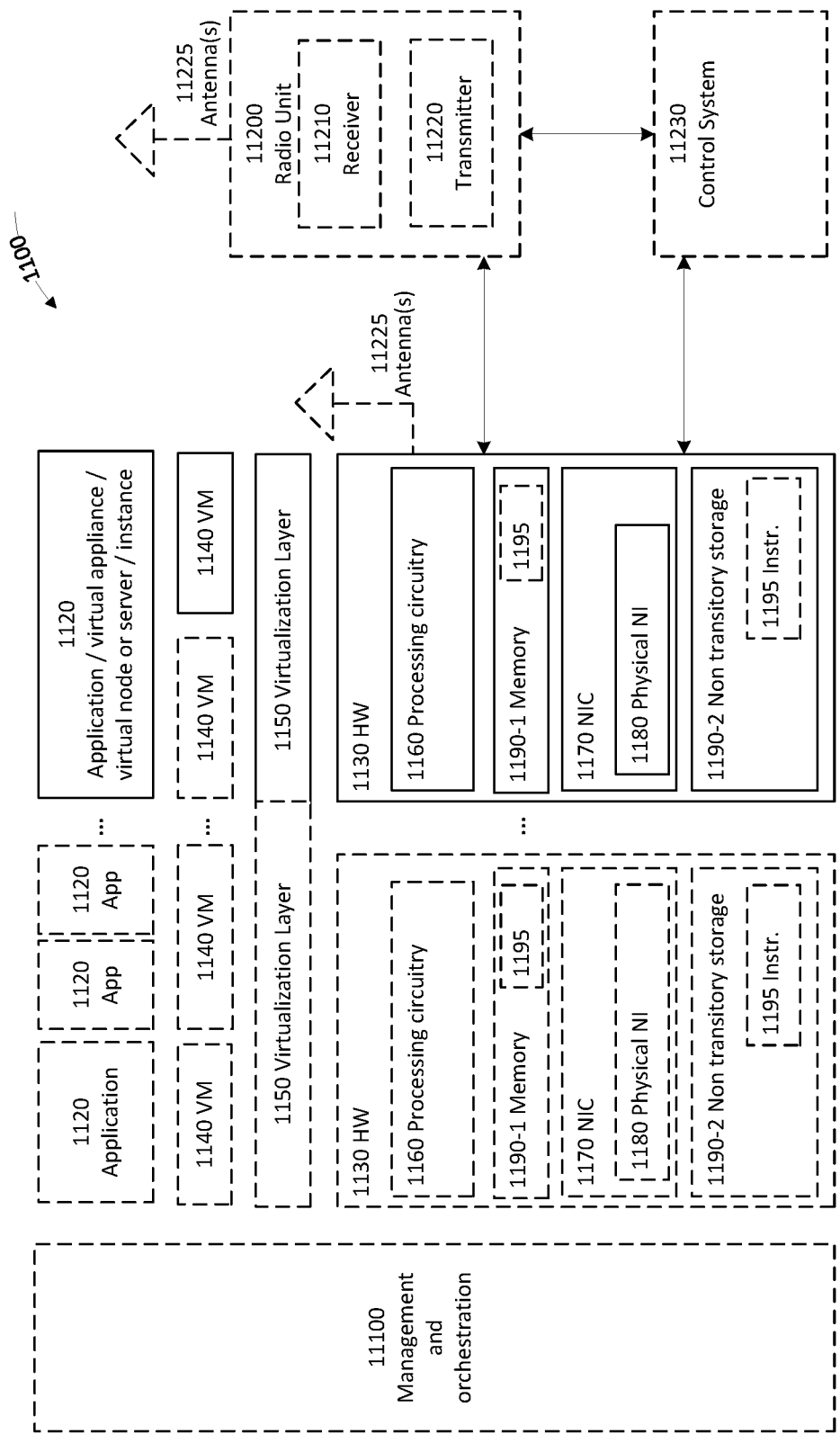
FIG. 11 is a block diagram of a virtualization environment in accordance with some embodiments.

FIG. 11: Virtualization environment in accordance with some embodiments

FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 11, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signalling can be effected with the use of control system 11230 which may alternatively be used for communication between the hardware nodes 1130 and radio units 11200.

Figure 12:
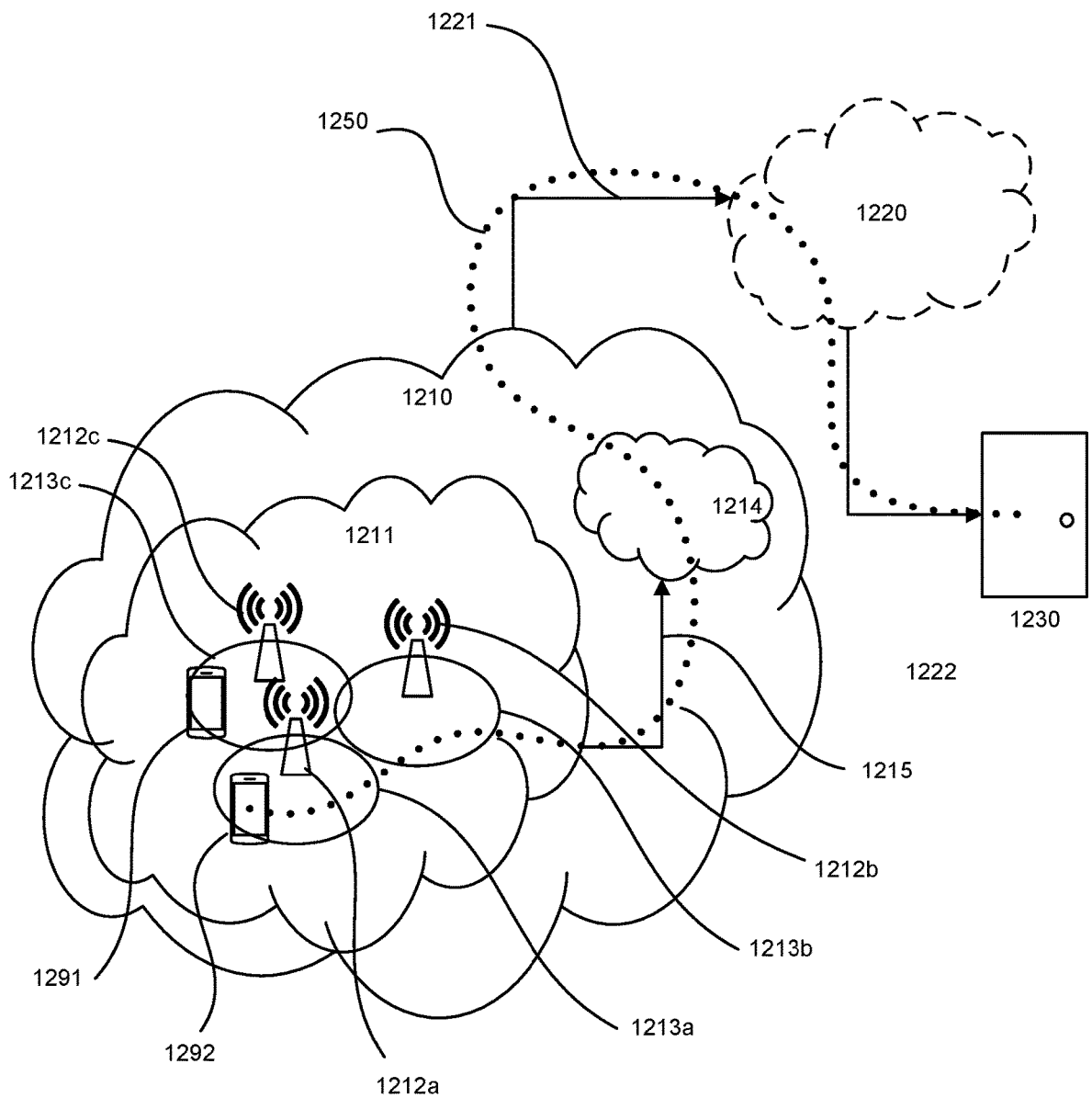
FIG. 12 is a block diagram of a telecommunication network connected via an intermediate network to a host computer in accordance with some embodiments.

FIG. 12: Telecommunication network connected via an intermediate network to a host computer in accordance with some embodiments.

With reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Figure 13:
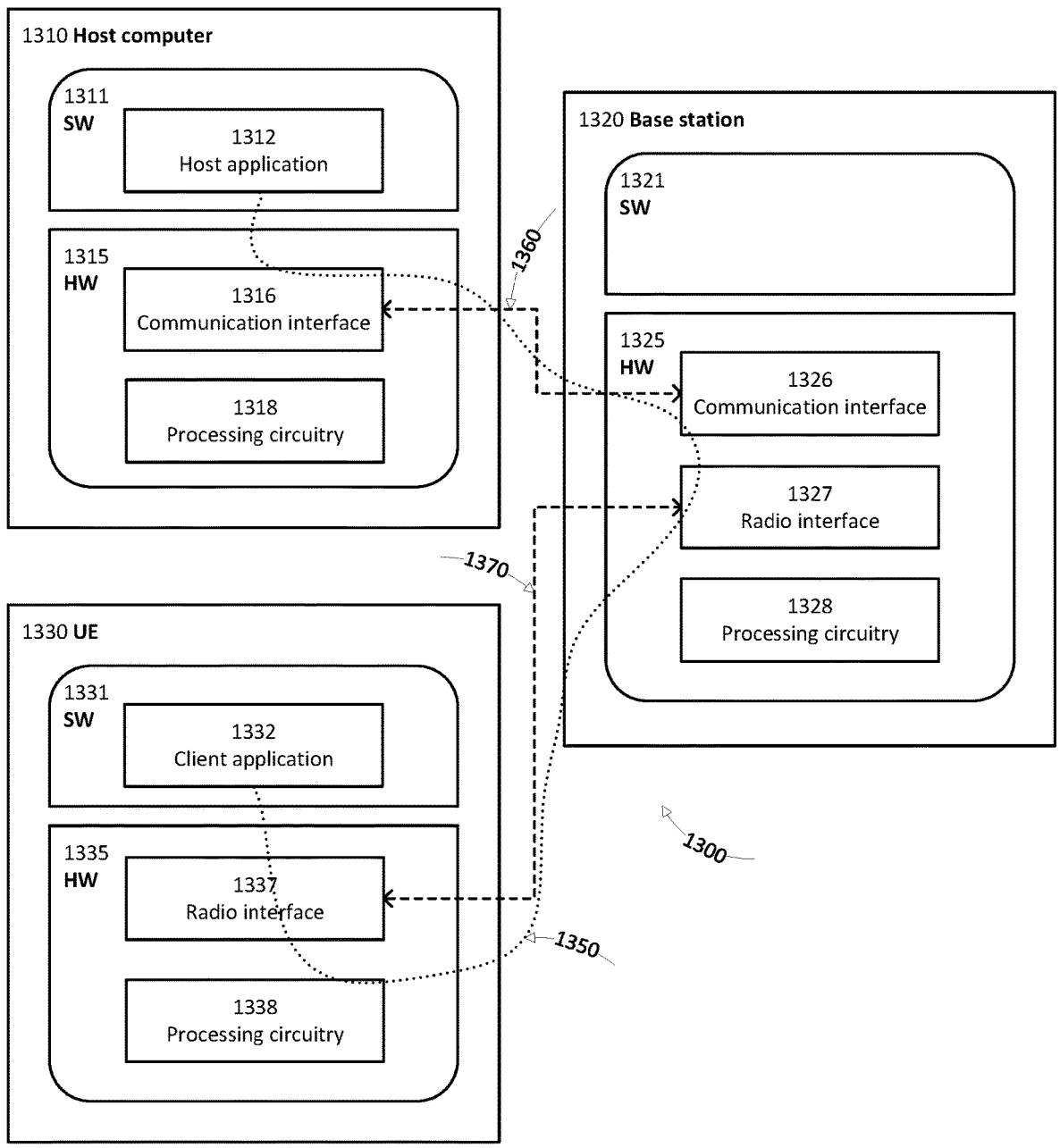
FIG. 13 is a block diagram of a host computer communicating via a base station with a user equipment over a partially wireless connection in accordance with some embodiments.

FIG. 13: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 13. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

It is noted that host computer 1310, base station 1320 and UE 1330 illustrated in FIG. 13 may be similar or identical to host computer 1230, one of base stations 1212a, 1212b, 1212c and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments may improve the performance of OTT services provided to UE 1330 using OTT connection 1350, in which wireless connection 1370 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 14:
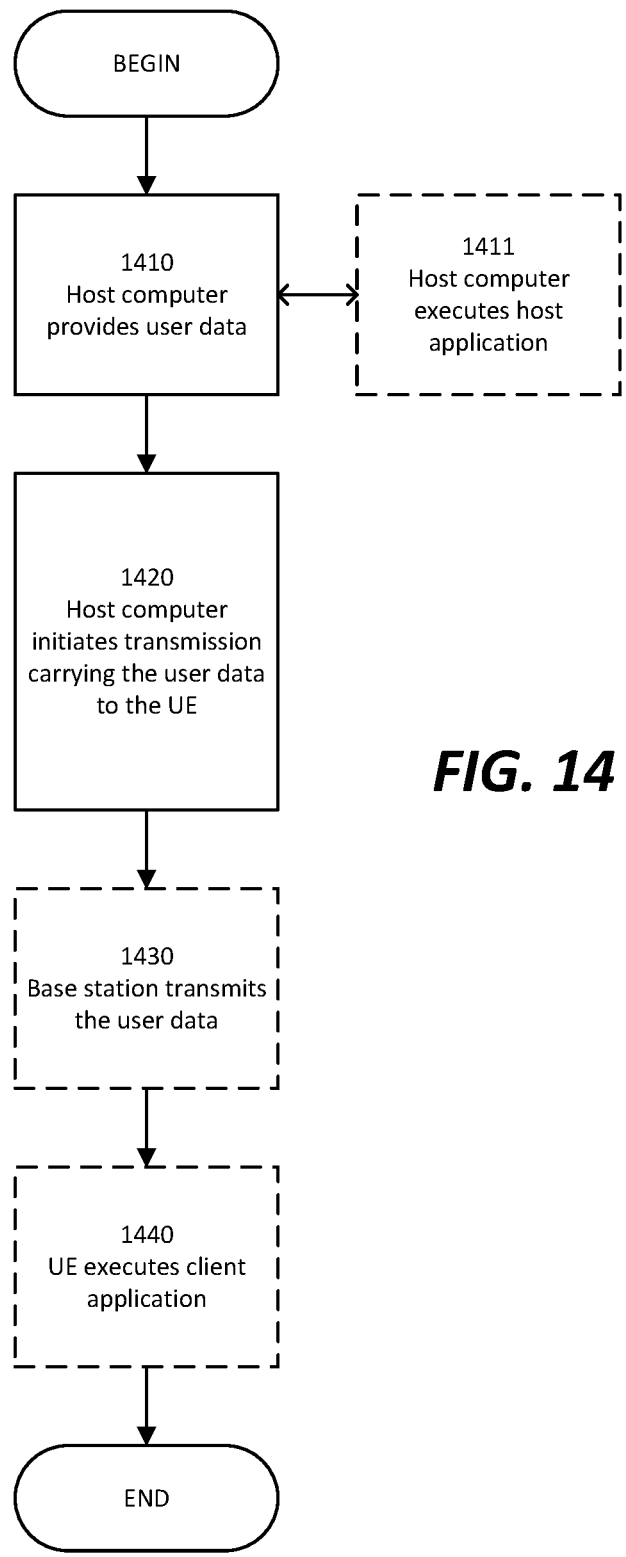
FIG. 14 is a block diagram of methods implemented in a communication system including a host computer, a base station, and a user equipment in accordance with some embodiments.

FIG. 14: Methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
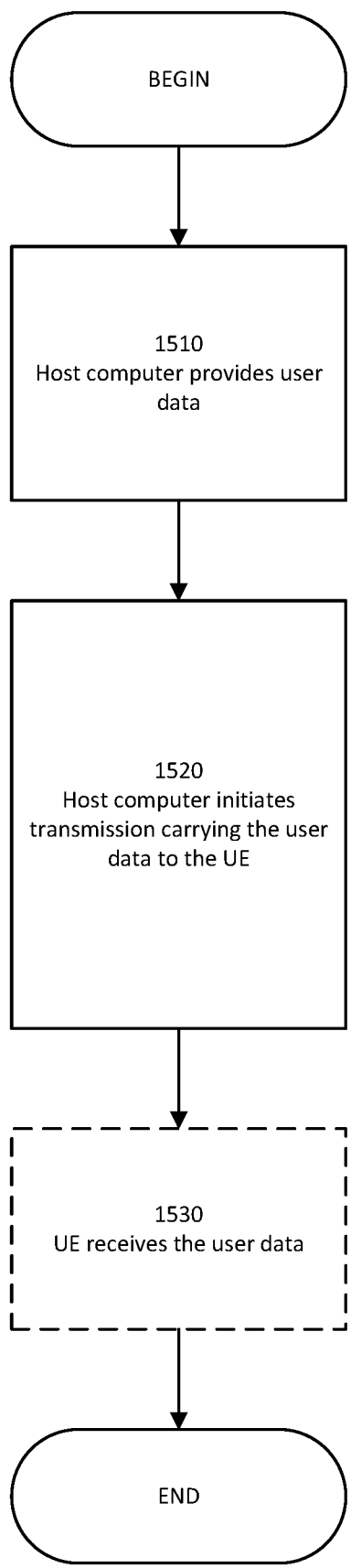
FIG. 15 is a block diagram of methods implemented in a communication system including a host computer, a base station, and a user equipment in accordance with some embodiments.

FIG. 15: Methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 16:
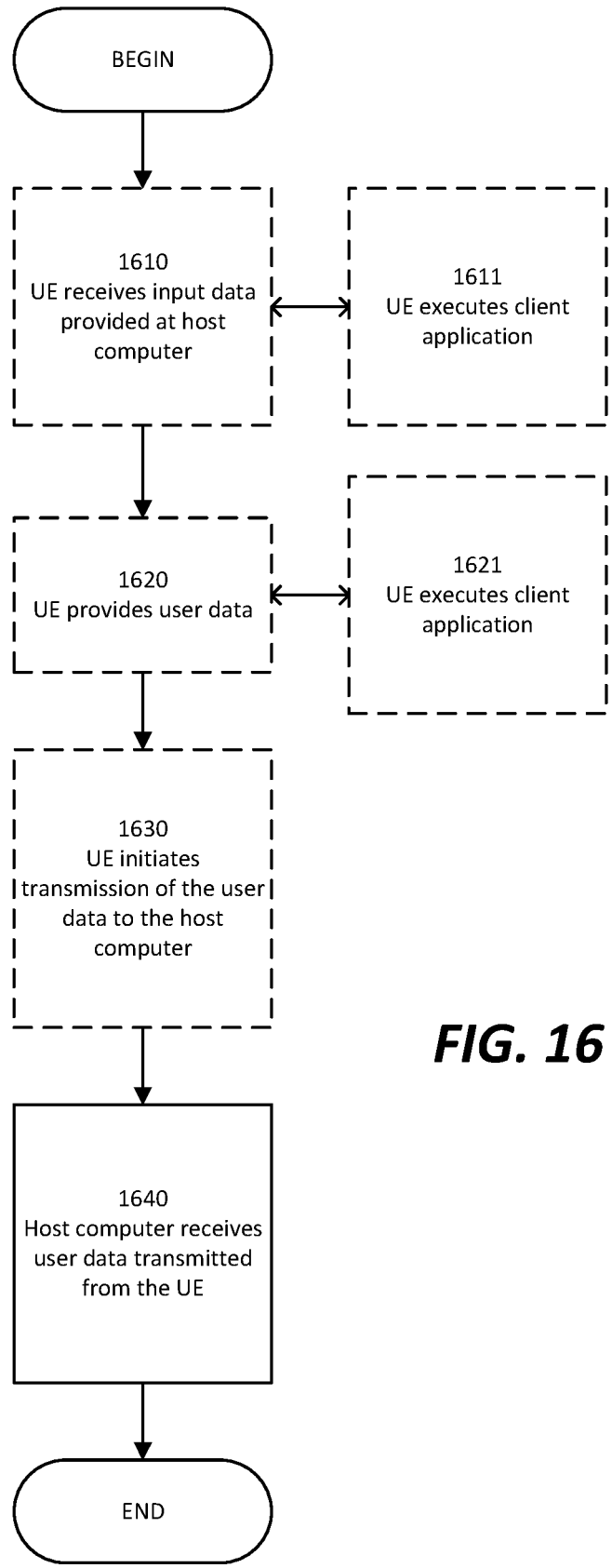
FIG. 16 is a block diagram of methods implemented in a communication system including a host computer, a base station, and a user equipment in accordance with some embodiments.

FIG. 16: Methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 17:
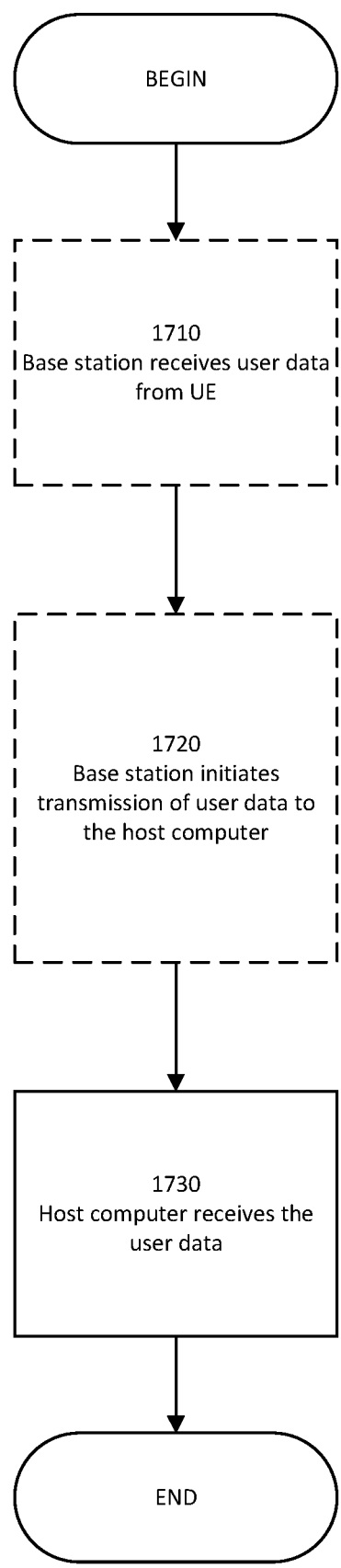
FIG. 17 is a block diagram of methods implemented in a communication system including a host computer, a base station, and a user equipment in accordance with some embodiments.

FIG. 17: Methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method of operating a network node in a wireless communication system, the method comprising:
configuring a downlink control information, DCI, message that schedules uplink or downlink communications with a user equipment, UE, in a plurality of serving cells, the DCI message not including an explicit new data indicator, NDI, field for at least one of the serving cells scheduled by the DCI message, the DCI message including an explicit NDI field for a first one of the serving cells scheduled by the DCI message, the explicit NDI field providing an implicit NDI indication for remaining ones of the serving cells scheduled by the DCI message, the implicit NDI indication indicating that data retransmission is being scheduled for the remaining ones of the serving cells scheduled by the DCI message; and transmitting the DCI message to the UE.

2. The method of claim 1, wherein the DCI message schedules new data transmissions on all of the serving cells scheduled by the DCI message.

3. The method of claim 1, wherein the DCI message schedules data retransmissions on all of the serving cells scheduled by the DCI message.

4. The method of claim 1, wherein the DCI message comprises a hybrid automatic repeat request, HARQ, process identifier, HPID, for a first HARQ process associated with the at least one of the serving cells scheduled by the DCI message, the method further comprising:

determining an NDI value for the HPID associated with a transmission scheduled by the DCI message for the first HARQ process.

5. The method of claim 4, wherein determining the NDI value for the HPID comprises determining that the NDI value has toggled from a previous NDI value for the HPID.

6. The method of claim 4, wherein determining the NDI value for the HPID comprises determining that the NDI value has a predetermined value regardless of a previous NDI value for the HPID.

7. A network node including a processing circuit, a transceiver coupled to the processing circuit, and a memory coupled to the processing circuit, the memory including computer readable program instructions that, when executed by the processing circuit, cause the network node to perform operations comprising:

configuring a downlink control information, DCI, message that schedules uplink or downlink communications with a user equipment, UE, in a plurality of serving cells, the DCI message not including an explicit new data indicator, NDI, field for at least one of the serving cells scheduled by the DCI message, the DCI message including an explicit NDI field for a first one of the serving cells scheduled by the DCI message, the explicit NDI field providing an implicit NDI indication for remaining ones of the serving cells scheduled by the DCI message, the implicit NDI indication indicating that data retransmission is being scheduled for the remaining ones of the serving cells scheduled by the DCI message; and transmitting the DCI message to the UE.

8. A method performed by a user equipment, UE, in a wireless communication system, the method comprising:

receiving a downlink control information, DCI, message with a first DCI format that schedules uplink or downlink communications in a plurality of serving cells, the DCI message not including an explicit new data indicator, NDI, field for at least one of the serving cells scheduled by the DCI message, the DCI message including an explicit NDI field for a first one of the serving cells scheduled by the DCI message, the explicit NDI field providing an implicit NDI indication for remaining ones of the serving cells scheduled by the DCI message; and determining, in response to the DCI message, at least one of:

an NDI value associated with the scheduled communications for the at least one of the serving cells scheduled by the DCI message; and that the scheduled communications for the at least one of the serving cells scheduled by the DCI message contains a new data transmission.

9. The method of claim 8, wherein the UE monitors a DCI message with a second DCI format that is different from the first DCI format, that schedules uplink or downlink communications in a single serving cell, the second DCI format containing an explicit NDI field for the single serving cell in addition to monitoring the DCI message that schedules uplink or downlink communications in the plurality of serving cells.

10. The method of claim 8, wherein the implicit NDI indication for the remaining ones of the serving cells scheduled by the DCI message indicates that data retransmission is being scheduled for the remaining ones of the serving cells scheduled by the DCI message.

11. The method of claim 8, wherein the DCI message comprises a hybrid automatic repeat request, HARQ, process identifier, HPID, for a first HARQ process associated with the at least one of the serving cells scheduled by the DCI message, the method further comprising:

determining an NDI value for the HPID associated with a transmission scheduled by the DCI message for the first HARQ process.

12. The method of claim 11, further comprising:

determining whether the determined NDI value indicates that a scheduled transmission associated with the HPID is a retransmission;

receiving a transport block in the scheduled transmission;

comparing a transport block size of the received transport block with a transport block size of a previously received transport block associated with the HPID; and in response to determining that the transport block size of the received transport block and the transport block size of the previously received transport block associated with the HPID do not match, flushing the previously received transport block associated with the HPID from a receive buffer.

13. The method of claim 8, further comprising:

monitoring a first DCI message with the first DCI format that schedules uplink or downlink communications in a plurality of serving cells, wherein the DCI message does not include an explicit NDI field for at least one of the serving cells scheduled by the first DCI message; and;

monitoring a second DCI message with a second DCI format that schedules uplink or downlink communications for only one serving cell, wherein the DCI message includes an explicit new data indicator, NDI, field for the serving cell scheduled by the second DCI message.

14. A communication device including a processing circuit, a transceiver coupled to the processing circuit, and a memory coupled to the processing circuit, the memory including computer readable program instructions that, when executed by the processing circuit, cause the communication device to perform operations comprising:

receiving a downlink control information, DCI, message that schedules uplink or downlink communications in a plurality of serving cells, the DCI message not including an explicit new data indicator, NDI, field for at least one of the serving cells scheduled by the DCI message, the DCI message including an explicit NDI field for a first one of the serving cells scheduled by the DCI message, the explicit NDI field providing an implicit NDI indication for remaining ones of the serving cells scheduled by the DCI message; and determining, in response to the DCI message, at least one of an NDI value associated with one of the scheduled communications and that the scheduled communications contain new data transmission in all serving cells scheduled by the DCI message.

* * * * *